US006308066B1

United States Patent
Ranta et al.

(10) Patent No.: US 6,308,066 B1
(45) Date of Patent: *Oct. 23, 2001

(54) METHOD TO DETERMINE NEIGHBOR CELL DATA IN A MOBILE CELLULAR SYSTEM AND A MOBILE STATION

(75) Inventors: Pekka Ranta, Nummela; Jukka Ranta, Salo, both of (FI)

(73) Assignee: Nokia Mobile Phones, Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,959

(22) Filed: Jan. 7, 1998

(30) Foreign Application Priority Data

Jan. 9, 1997 (FI) ......................................................... 970089

(51) Int. Cl.[7] ................................ H04Q 7/20; H04Q 7/00
(52) U.S. Cl. .......................... 455/432; 455/437; 455/440; 455/441; 370/331; 370/335; 370/337
(58) Field of Search ..................................... 455/437, 440, 455/441, 528, 525, 432; 370/331, 335, 337, 522, 528

(56) References Cited

U.S. PATENT DOCUMENTS

| 5,179,559 | | 1/1993 | Crisler et al. ........................ 370/95.1 |
| 5,345,448 | | 9/1994 | Keskitalo ............................ 370/95.3 |
| 5,383,221 | * | 1/1995 | Akita et al. ................................ 375/7 |
| 5,410,733 | | 4/1995 | Niva et al. ........................... 455/33.2 |
| 5,483,668 | | 1/1996 | Malkamaki et al. ................. 455/33.2 |
| 5,524,009 | | 6/1996 | Tuutijarvi et al. ................... 370/95.3 |
| 5,530,917 | * | 6/1996 | Andersson et al. ................. 455/54.1 |
| 5,732,073 | * | 3/1998 | Kusaki et al. ........................ 370/280 |
| 5,898,925 | * | 4/1999 | Honkassalo et al. ................ 455/437 |
| 6,011,786 | * | 1/2000 | Dent ..................................... 370/330 |

FOREIGN PATENT DOCUMENTS

| 2 294 610 A | 5/1996 | (GB) . |
| WO 94/29981 | 12/1994 | (WO) . |
| WO 97/49203 | 12/1997 | (WO) . |

OTHER PUBLICATIONS

European Search Report.

IEEE Journal On Selected Areas In Communications, vol. 12, No. 4, May 1994 "Design Study for a CDMA–Based Third–Generation Mobile Radio System", Baier et al.

* cited by examiner

*Primary Examiner*—William Trost
*Assistant Examiner*—Sheila Smith
(74) *Attorney, Agent, or Firm*—Perman & Green, LLP (57) ABSTRACT

The object of the invention is a method to determine channel information in a cellular system, in which method user information is transmitted in information frames, which are transmitted by the current cell base station, and in which method neighbor cell base station information (105, 205, 305, 405, 505, 603, 612, 615, 622, 623, 632, 633) is received in order to synchronise to the neighbor cell base station. Preferably the method can be used to speed up or to enable the determination of channel information in connection with handover from the area of one base station to another. In the method according to the invention the user information transmission/reception is preferably interrupted during the reception (205, 305, 612, 632) of user information, which can be i.a. the signal level, the base station identity code (BSIC). In an urgent situation, during a rapid handover from one cell to another, said information can then be received at a sufficient rate, in other words also when an idle frame (102) can not be obtained in a favorable way. The information is not received simultaneously with the transmission/reception of user information, so that only one receiver is required.

14 Claims, 5 Drawing Sheets

METHOD TO DETERMINE NEIGHBOR CELL DATA IN A MOBILE CELLULAR SYSTEM AND A MOBILE STATION

FIELD OF THE INVENTION

The object of the invention is a method to determine the neighbour cell information in a cellular system where user information is carried in information frames transmitted by the base station of the current cell, and in which method information, for instance neighbour cell information, of the neighbour cell base station is received in order to synchronise to the base station of the neighbour cell or in order to perform level measurements. The method is preferably used to speed up or to enable determination of channel information during handover from one base station area to another.

BACKGROUND ART

It is important that a mobile cellular station can get information about the cells surrounding the cell corresponding to its current location, so that it can move to the next cell (MAHO, Mobile Assisted Handover). The information which must be determined in this context is i.a. the signal levels, signal strengths and the synchronisation information of the base stations of neighbour cells. For instance in the GSM system (Global System for Mobile communications) the synchronisation information is the frequency correction channel (FCCH) and the synchronisation channel (SCH) of the neighbour cell. The object is to acquire the information without causing interference in the user information during a call.

In continuous transmission systems (CDMA, Code Division Multiple Access; FDMA, Frequency Division Multiple Access) and in time division systems (TDMA, Time Division Multiple Access), when all time slots are used for the communication of information, a problem is the second receiver required for the determination. In a TDMA system, such as the GSM system, where one or more idle frames are reserved for the determination of neighbour cell information, the idle time is used for reception. There is a problem in that the idle time is barely sufficient for the reception. Due to this it is not always possible to obtain the FCCH and SCH information during the idle time. On the average, this information is obtained only after several unsuccessful reception during the idle frames, when the location in time of the FCCH and the SCH is unknown, or it is necessary to wait over several idle frames, even when the location of the FCCH and the SCH is known.

Figure 1:
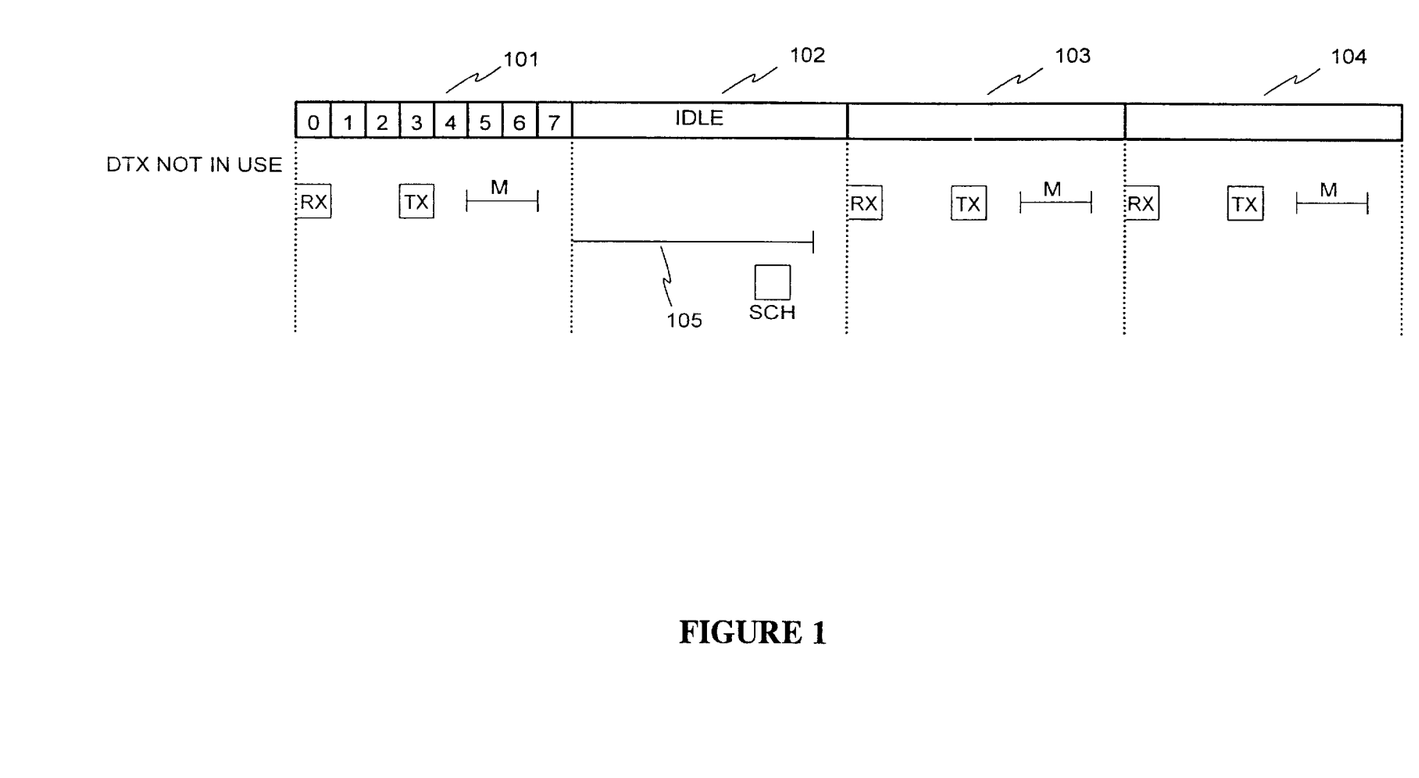
FIG. 1 shows a prior art method to receive a neighbour cell SCH time slot during the idle frame.

Prior art is illustrated with the aid of FIG. 1. There the frames 101, 103 and 104 are normal TDMA information frames of the GSM system. The frame 102 is an idle frame, during which neighbour cell information is received 105 in a well known way. The time slots 0, 1, 2, . . . 7 of the information frames are used in the following way: the time slot 0 transmits received information RX of the downlink transmission direction: the time slot 3 transmits the transmitted information TX of the uplink transmission direction, and neighbour cell signal level measurements are made during the time slots 5 and 6 at a monitoring moment M, which is not tied to the time slots. The other time slots are used i.a. for changing the synthesiser frequency. RX and TX are information signals, which can be speech or data information. The so called discontinuous transmission method (DTX) is not used during the period shown in the figure.

When the SCH time slot appears in the determination period 105 it is read during the idle frame 102. However, as mentioned above, this happens very seldom, and in this way the time slot is not usually found at the first attempt. Several systematically unsuccessful attempts are required in order to success, if the FCCH and SCH locations in time are unknown, or a delay over several idle frames is required, even when the FCCH and SCH locations are known.

SUMMARY OF THE INVENTION

The object of the invention is to create a solution for the determination of neighbour cell information, with which the above mentioned prior art problems can be avoided.

The characteristic features of the method according to the invention are presented in the characterizing part of claim 1. Preferred embodiments of the invention are presented in the characterizing parts of claims 2 to 7. The mobile station according to the invention is characterised by the features presented in the characterizing part of claim 11.

In the method according to the invention the reception/transmission of user information is preferably interrupted during reception of the neighbour cell information, which can be i.a. the signal level, the base station identity code (BSIC). Then said information can be received sufficiently often in an urgent situation, during a rapid handover from one cell to another, that is, also when no idle frame can be favourably received. The reception of neighbour cell information is not made simultaneously with reception/transmission of user information, and thus only one receiver is required. The invention makes it possible that in future systems the idle frame is not required at all. Also in delay nonsensitive packet reservation multiple access systems it is possible to delay the transmission during measurements.

The advantage of the method according to the invention is that the reception of neighbour cell information is made faster and more efficient when it uses time from the communication channel. Communication channel means the transmission path formed by the RX and TX time slots in the information frame. A channel encoding may reduce decreasing of the quality of the actual speech and data. The length of the interruption in reception is short compared to the interleaving time. The invention is preferable particularly in data services having long interleaving depths, for instance 19 bursts in GSM. Further the packet retransmission (automatic repeat request, ARQ) in GSM data services will correct the errors of the transmission path. Thus it is usually possible to correct all transmission errors regarding data communication. The reception moment can be random or deterministic, so that the method utilises as much as possible the active periods of the discontinuous transmission, in other words those periods during which no active speech is transmitted during a call. When an active period of the discontinuous transmission has begun, it is possible to determine with a rather high reliability that the speech will not recommence at once, because the information reception time is rather short compared to human reactions. Said information can then be received when a period just has begun, and still one can be almost sure not to interfere with the speech. During about 50% of the time the speech service will need no transmission.

The interval between repeated reception of neighbour cell information can be controlled on the basis of e.g. the signal quality, such as strength and correctness. When the signal quality is high there is a low probability of cell handover, and the reception can be reduced. When the signal quality is low there is a high probability of cell handover, and the reception of neighbour cell information is increased. Thus it is possible to minimise interruptions in the reception of the information signal.

A cell handover has a high probability i.a. when there is a long distance between the mobile station and the base station or when the attenuation on the radio path from the base station is high, when the signal strength from neighbour base stations starts to increase compared to the current base station, or when the mobile station moves at a high speed.

Preferably the reception of neighbour cell information can also be controlled so that information from different neighbour cells is received at different repetition rates. Further the neighbour cell information can be received at different repetition rates for different services and/or operating modes of the system.

The invention is preferably applied in connection with the discontinuous transmission (DTX) method of the GSM system. In this method transmission is interrupted when the voice activity detection (VAD) does not detect any speech to be transmitted. Then a so called SID frame (SIlence Descriptor) will be transmitted, which indicates the noise parameters describing the background noise. These SID frames are transmitted at a substantially lower rate than the frames for active speech. Thus there is substantially more free time between the SID frames for performing measurements than between the active speech frames. The GSM system is described in more detail e.g. in the book: [1] Michel Mouly & Marie-Bernadette Pautet: The GSM System for Mobile Communications, 1992, ISBN 2-9507190-0-7.

The method according to the invention is particularly well suited for the reception of neighbour cell information in the GSM system or in future systems, because the reception is quite short, but it must be made at a certain moment. In the present GSM system and with the prior art method it is often necessary to wait quite long i.a. for the synchronisation information transmitted on the SCH channel of the neighbour cell base station to slide over the position in time of the idle frame of the own base station. With the method according to the invention this information can be read also at other times than in the idle state. Thus the idle frames are not necessarily required. The position of the SCH is known in advance with an uncertainty of about 50 $\mu$s, and it is a little shorter than the time slot having the length of 577 $\mu$s. Thus this information can be received so that it causes the rejection of only one information carrying time slot.

A further advantage of the invention is that the need to use two receivers is avoided in continuous transmission systems and in a time division system, which utilises all time slots for information transmission.

BRIEF DESCRIPTION OF THE DRAWINGS

The invention is described below with the aid of the enclosed drawings, in which.

DETAIL DESCRIPTION OF THE PREFERRED EMBODIMENT

FIG. 1 was described above in connection with the prior art description.

Figure 2:
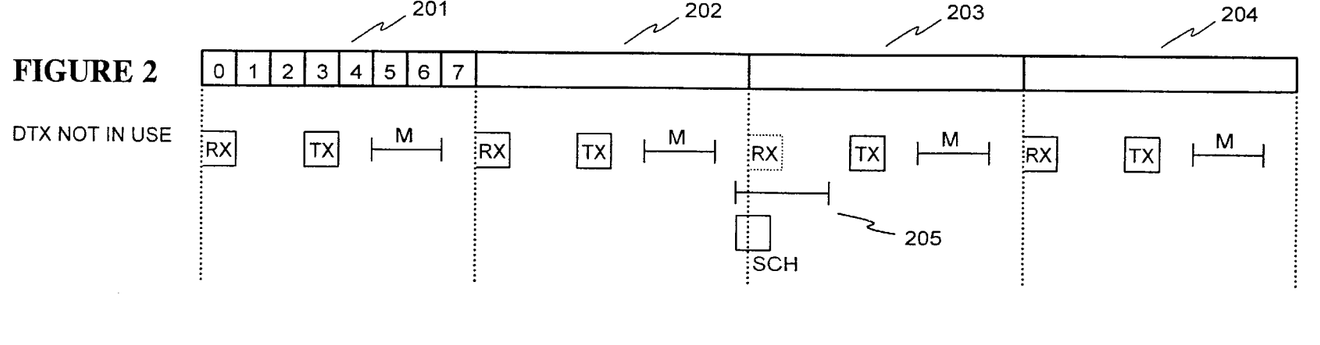
FIG. 2 shows a way according to the invention to receive a neighbour cell SCH time slot, when the discontinuous transmission method is not in use.

The consecutive frames 201, 202, 203, 204 of FIG. 2 represent normal information frames. The operation is according to FIG. 2 when time is required in addition to the idle frame 102 (FIG. 1) in order to read neighbour cell information, for instance the SCH time slot. After the measurements M of the neighbour cell signal levels the selected base station is measured in frame 202 over the received time slot. This provides an extra determination time 205 in addition to the idle frame.

Figure 3:
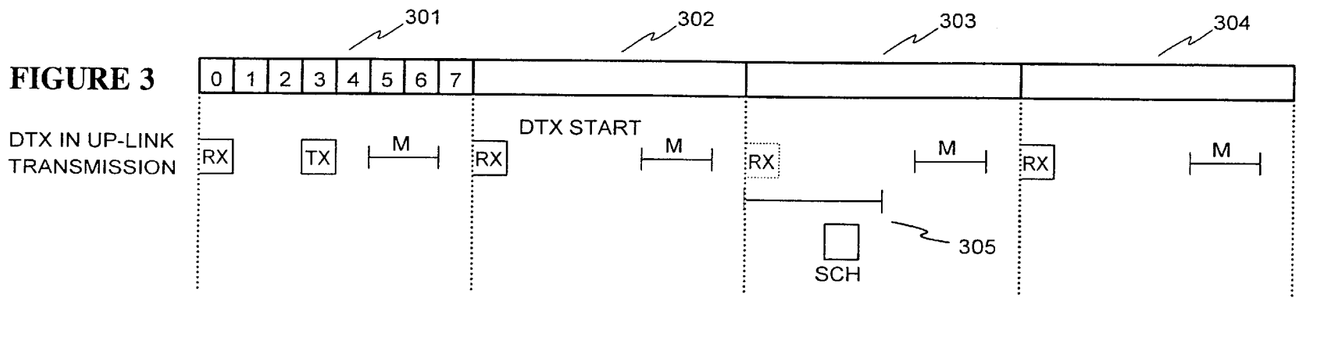
FIG. 3 shows a way according to the invention to receive a neighbour cell SCH time slot, when the discontinuous transmission method is used in the up-link transmission direction.

The practice shown in FIG. 3 utilises the discontinuous transmission method (DTX) of the GSM system in which transmission is interrupted when the VAD does not detect any active speech to be transmitted. Speech activity is measured from the signal energy. The object is to encode the speech at 13 kbit/s when the speaker is actively speaking, and otherwise at about 500 bit/s. The background noise is encoded at the slow rate. In the active state a frame of 260 bits is transmitted at intervals of 20 ms, otherwise a SID frame at intervals of 480 ms. Thus there is substantially more free time for measurements between the SID frames than between active speech frames.

The consecutive frames 301, 302, 303, 304 in FIG. 3 represent normal information frames. The discontinuous transmission method is activated in frame 302 in the up-link direction, and it stays activated in the following frames. During the activated period the TX time slot is not transmitted, and as the RX time slot is also left unreceived, the determination time 305 is increased and thus a period with the length of almost one frame is obtained for the reception of neighbour cell information, e.g. synchronisation information.

Figure 4:
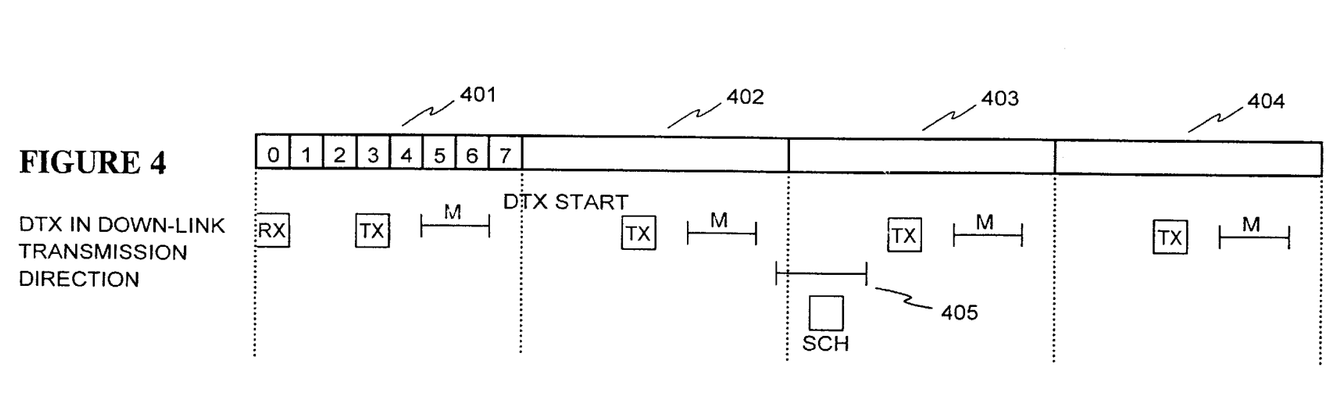
FIG. 4 shows a way according to the invention to receive a neighbour cell SCH time slot, when the discontinuous transmission method is used in the down-link transmission direction.

The consecutive frames 401, 402, 403, 404 in FIG. 4 represent normal information frames. The discontinuous transmission method is activated in frame 402 in the down-link transmission direction, and it stays activated in the following frames.

During the activated period no information is transmitted in the RX time slot, which is illustrated as an interval in the frames. The time slot of the received information is used to determine the neighbour cell information 405.

Figure 5:
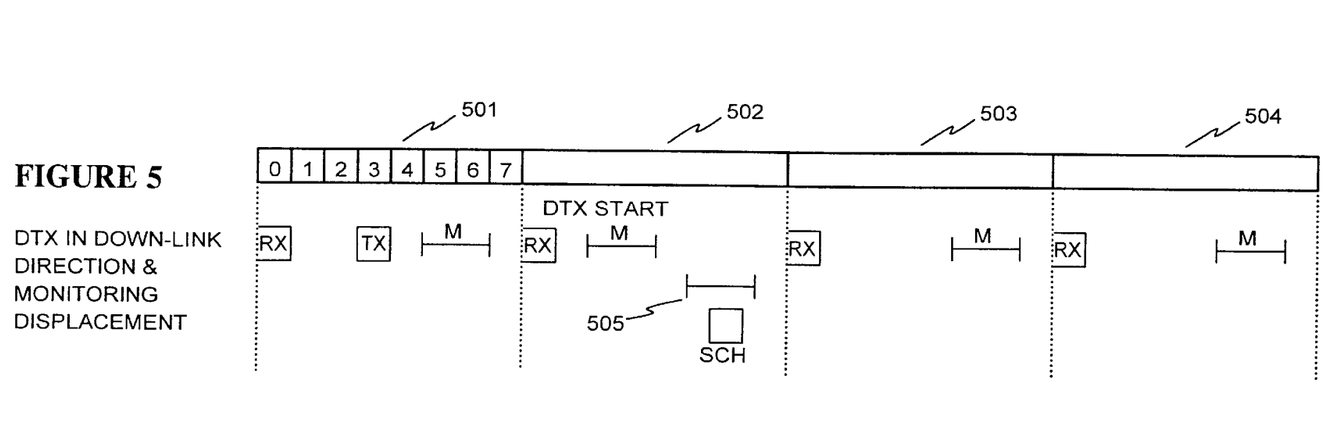
FIG. 5 shows a way according to the invention to receive a neighbour cell SCH time slot, when the discontinuous transmission method used in the up-link transmission direction, and when monitoring replaces transmission.

The consecutive frames 501, 502, 503, 504 in FIG. 5 represent normal information frames. The discontinuous transmission method is activated in frame 502 in the up-link transmission direction, and it stays activated in the following frames, the frames 502, 503 and 504. The measurement of the neighbour cell signal level is shifted to an earlier period, i.e. to the transmission time slot, and the obtained longer time 505 is used for the determination of neighbour cell information, for instance the synchronisation information.

Figure 6:
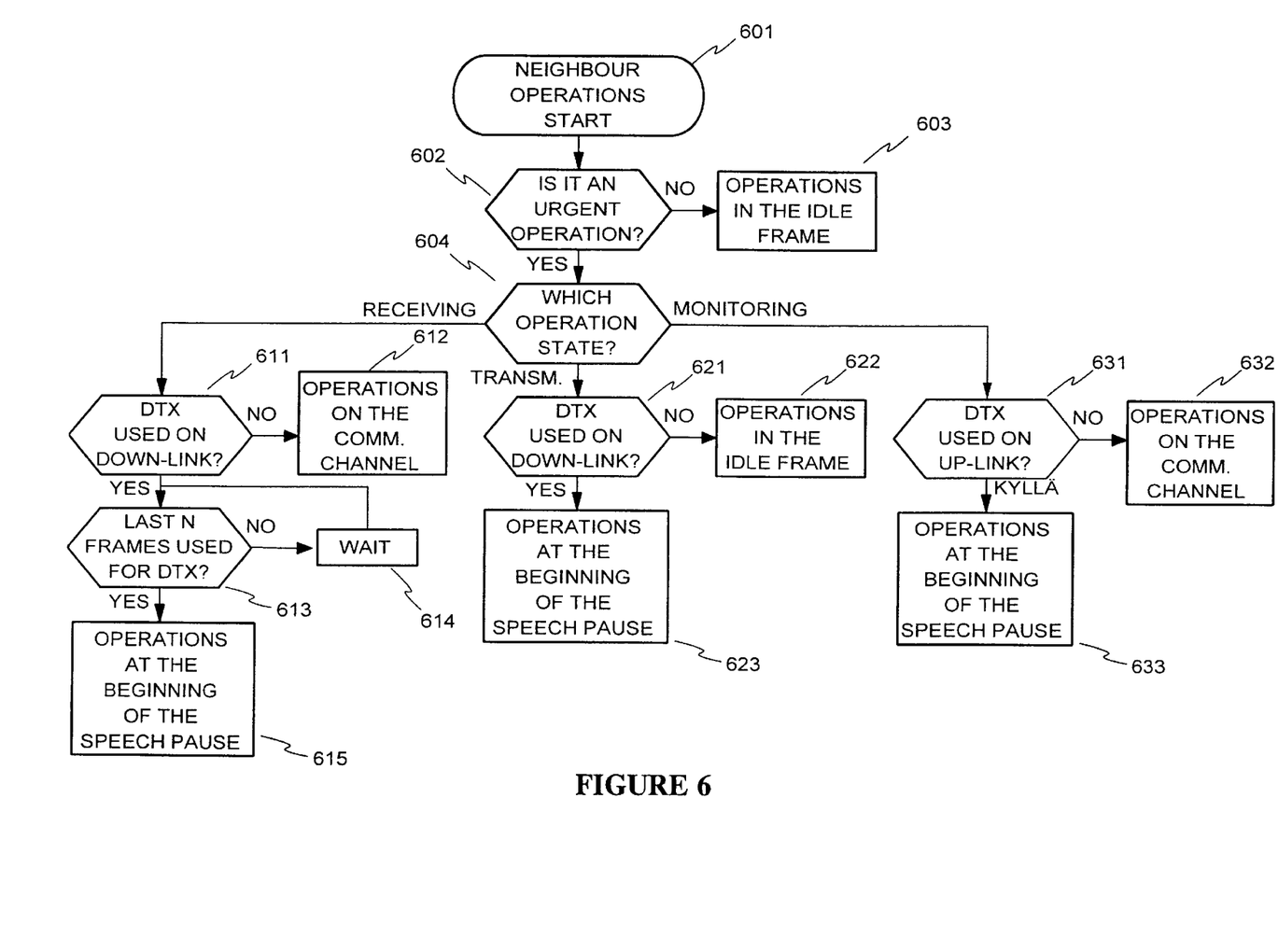
FIG. 6 shows as a block diagram some alternative operations to determine neighbour cell information.

FIG. 6 presents as a block diagram the operation alternatives in order to perform neighbour operations. The neighbour operations are started in block 601. The first task is to examine in block 602 whether the operation is urgent, and if not, the operation is performed by prior art idle frames, block 603. In an urgent situation the block 604 can select one of three operational states: reception, transmission or monitoring.

During operation in the reception state block 611 examines whether DTX is used in the down-link transmission direction, and if not, the neighbour cell determination operations are performed by stealing reception time, block 612, as was illustrated in FIG. 2 by the segment of a line 205. When the discontinuous transmission method is used in the down-link transmission direction the block 613 examines whether the speech pause actually has begun, or have the last received N frames been DTX activated. If the frames have not been activated, then block 614 waits until they have been activated, whereby it is possible to perform neighbour cell determination operations instead of the missing received information, block 615, as was illustrated in FIG. 4.

During operation in the transmission state the block 621 examines whether DTX is used in the up-link transmission direction, and if not, the block performs neighbour cell information determination operations according to prior art, block 622, in the idle frame, frame 102 in FIG. 1; otherwise the determination operations are performed at the beginning of a speech pause using the transmission time slot, block 623.

During operation in the monitoring state the block 631 examines whether DTX is used in the up-link transmission direction, and if not, the neighbour cell information determination operations are performed by stealing reception time on the communication channel block 632, segment of line 205 in FIG. 2; otherwise the determination operations are performed at the beginning of a speech pause and the monitoring is shifted to the transmission time slot, block 633, segment of line 505 in FIG. 5.

Figure 7:
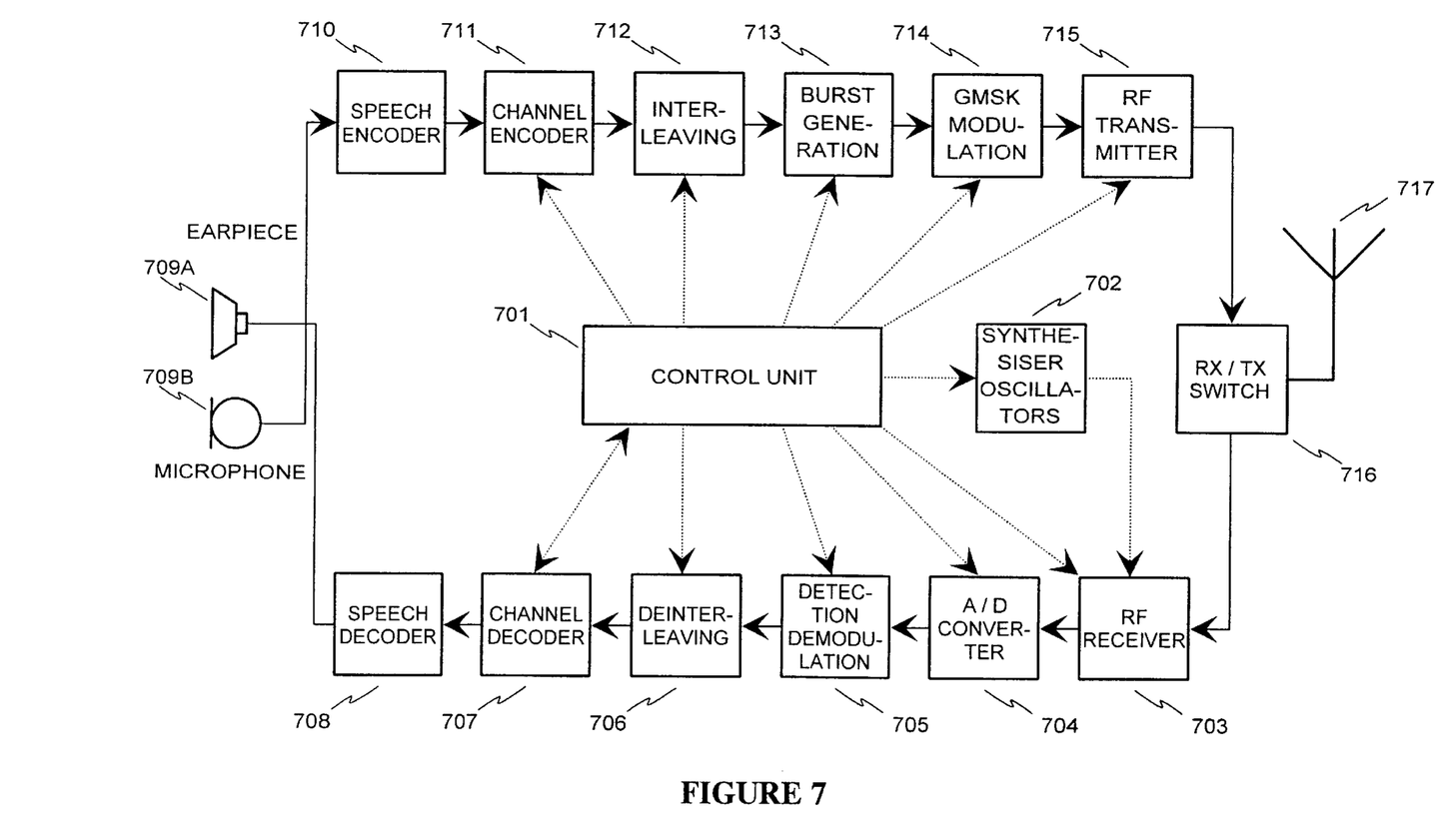
FIG. 7 shows as a block diagram the parts of a GSM mobile station, which are essential in order to describe the invention.

FIG. 7 shows as a block diagram i.a. the parts of a GSM mobile station, which are essential in order to describe the invention. The changes caused by the invention are primarily contained in the control unit 701. Which controls the synthesiser oscillators 702 in order to change the reception frequency of the RF receiver 703. In a situation according to the invention, when neighbour cell information is received, the control unit 701 sets the reception frequency to the frequency of the neighbour cell at the moment it determined. The frequency of the neighbour cell's base station is typically obtained from a so called neighbour cell list, which the telephone receives. For instance in the GSM system the neighbour cell list is received on the broadcast control channel (BCCH). The invention utilises the information about the signal quality obtained from the decoder 707. The signal quality can be determined e.g. from the signal-to-noise ratio. This method is described e.g. in the publication [2] John G. Proakis: Digital communications (second edition), McGraw Hill Inc., New York. The signal quality information can be used to determine the measurement rate. If the signal quality is low, the measurements are made at a higher rate, because the handover probability increases.

Speech spoken to the microphone 709b is digitised on 13 bits at a sampling rate of 8 kHz, and the sample stream is encoded into parameters in the speech encoder 710. Speech encoding produces speech frames of 260 bits, and each frame corresponds to a speech sample with the length of 20 ms. They are further supplied to a channel encoder 711, which comprises a block encoder and a convolution encoder. The block encoder adds a bit pattern at the end of each speech frame, and the convolution encoder adds redundancy to the frame generated above, which lengthens the frame. Both operations are performed in order to facilitate error detection and correction at the reception. The length of the frame generated by the channel encoding is 456 bits.

The next step is to perform a two-phase interleaving 712. First the bit sequence of the frame generated above is processed by a certain algorithm, and the obtained new frame is divided into eight equal parts. These parts are further placed into eight successive frames of a time division TDMA (Time Division Multiple Access) system. The most important task of the interleaving is to spread out the transmission errors, which usually occur as bursts, evenly in eight frames. Thus successive bit errors occurring in the transmission of the TDMA frame causes single bit errors in the frames generated by the channel encoding, and these single bit errors are corrected more easily.

The information is also encrypted so that unauthorised quarters can not listen in to the transmitted speech. The encrypted data is converted into an information burst in the block 713 by adding a training sequence, stop bits and time. A GMSK modulation (Gaussian Minimum Shift Keying) is performed in block 714, whereby the bits are transformed from a digital form into an analogue signal so that the bits are represented by different phases of a sinusoidal wave.

Finally the modulated burst is transmitted at radio frequency by the RF transmitter 715 on one of the centre frequencies of the 900 MHz frequency band, and to the antenna 717 via the Rx/Tx switch 716, which now is in the transmit position.

The receiving sections of a GSM mobile station operate in the reverse order compared to that presented above. This is shortly described in the following paragraph.

When information is received from the antenna 717 the Rx/Tx switch 716 is in a corresponding position and supplies the signal to the RF receiver 703, whose receive frequency is generated by the synthesiser oscillators 702. Then the signal is supplied to the A/D converter 704, which converts the analogue signal into a digital one. Then there is a detection demodulation 705, deinterleaving 706, channel decoding 707, whereby there is an attempt to correct any errors, and speech decoding 708. The decoded speech is supplied to the earpiece 709a.

The sections 702 to 708 and 710 to 715 are controlled by the control unit 701, in which the modifications according to the invention are made. The modifications required by the invention are primarily software modifications, which enable the operation according to the method.

A method according to the invention is described as a general example when a GSM mobile station moves from one cell to another. The mobile station receives information from the current cell, but also from the surrounding neighbour cells. Handover to a new cell is started, when the signal from a neighbour cell has a higher quality than the current cell, which is detected by the signal level measurement M.

The signal level, frequency information and synchronisation of the new cell, i.e. the cell into which the movement is made, are measured during the handover. The measurement is made primarily during the received idle frame 102 (FIG. 1). With the aid of the discontinuous transmission method it can also be made 405 (FIG. 4) when there occurs a pause in the received speech, and the base station temporarily interrupts the transmission. If the neighbour cell information is not obtained during either of said periods, the information reception is temporarily interrupted when the base station of the current cell transmits, and the neighbour cell information for instance the synchronisation information, is received during the interruption 205 (FIG. 2). Thus information is received more often than there are idle frames. At least the frequency correction channel (FCCH) and the synchronisation channel (SCH) are separated from the received signal. The receiver adjusts its operating frequency to the frequency of the new cell's base station and synchronises to it. This is a mobile station assisted handover from one base station to another, from one cell to another.

The interruption in the reception of information data due to the urgency of the determination is so short, one time slot, that it will not cause degradation of the speech or data quality, if the caused error can be corrected using an interleaving/error correction method (Forward Error Correction, FEC). The sample of the user information is encoded into sequential TDMA frames, so that one missing frame will not cause missing information in the reception, because the sample can be reconstructed from the previous and the next frames. If it is impossible to correct the error, this causes a quality degradation in the signal-to-noise ratio of only about 6 to 10 dB. The user can not hear this degradation, unless the user is expecting this event.

Particularly the invention can be utilised in a system with continuous transmission, such as the CDMA (IS-95), which typically uses only one frequency (re-use 1), but in which, however, there is a need for handover (interfrequency handover). Particularly in the CDMA system it is a great problem to realise this handover. One way to realise this handover is presented in the publication [3] IEEE Journal on selected areas in communications, vol. 12, No. 4, May 1994 "Design Study for a CDMA-Based Third-Generation Mobile Radio System". The present invention enables this monitoring of neighbour base station channel information in order to realise the handover.

The invention can also be used e.g. to localise a mobile station, whereby the localisation utilises channel information of the neighbour cell base stations.

A few applications and a way to realise the method according to the invention were presented above. Of course the invention is not limited to the presented examples, but the inventive idea can be modified within the scope of the claims, e.g. regarding the detailed embodiment and the areas of use. Particularly it must be noted that although the examples presented above relate to the application of the invention in the GSM system, the invention can also be used in other digital TDMA, FDMA and CDMA cellular systems.

What is claimed is:

1. A method to determine channel information in a cellular system, in which user information is transmitted on a communication channel reserved for connection between a current cell base station and a mobile station, and in which there is received neighbour cell information transmitted from a neighbour cell base station, the method comprising:

interrupting an exchange of user information at a time during normal communication when continuous transmission is occurring and before signal quality becomes degraded; wherein all time slots except those used for a control channel are used for said continuous transmission; and receiving said neighbour cell information during a resulting interruption.

2. A method according to claim 1, wherein time of a repetition interval of the moments for reception of neighbour cell information is varied.

3. A method according to claim 2, wherein a handover probability is estimated, and a repetition rate of neighbour cell reception moments is varied on the basis of the handover probability.

4. A method according to claim 1 wherein the system is a time division system and neighbour cell information is received during randomly selected information frames.

5. A method according to claim 1, wherein the system is a time divisional system and neighbour cell information is received during predetermined information frames.

6. A method according to claim 5, wherein different information from neighbour cells are received at different reception rates.

7. A method according to claim 1, wherein different services and/or operating modes have different neighbour cell information reception rates.

8. A method according to claim 1 wherein when a pause in continuous transmission occurs, said neighbour cell information is received during said pause.

9. A method according to claim 1 wherein the system is a time division system, signal quality of a neighbour cell base station is monitored, and when a pause in continuous transmission occurs, and discontinuous transmission is active in an up-link transmission direction, said monitoring is performed in place of a missing transmission, and information is received between said monitoring and a next time of information reception.

10. A method according to claim 1 wherein said cellular system is a GSM system.

11. A method according to claim 1 wherein said cellular system is a CDMA system.

12. A mobile station for connection to a cellular system, said mobile station comprising:

means for transmitting and receiving user information on a communication channel between a current cell base station and said mobile station;

means to receive neighbour cell information from a neighbour cell base station;

means for interrupting an exchange of said user information; and means for receiving neighbour cell information transmitted by a neighbour cell base station during an interruption at a time during normal communication, when continuous transmission is occurring and before signal quality becomes degraded;

wherein all time slots except those used for a control channel are used for said continuous transmission.

13. A method to determine channel information in a cellular system, in which user information is transmitted on a communication channel reserved for connection between a current cell base station and a mobile station, and in which there is received neighbour cell information transmitted from a neighbour cell base station, the method comprising:

interrupting an exchange of user information at a time during normal communication when continuous transmission is occurring and before signal quality becomes degraded;

receiving said neighbour cell information during a resulting interruption; and wherein when a pause in continuous transmission occurs, said neighbour cell information is received during said pause.

14. A method to determine channel information in a cellular system, in which user information is transmitted on a communication channel reserved for connection between a current cell base station and a mobile station, and in which there is received neighbour cell information transmitted from a neighbour cell base station, the method comprising:

interrupting an exchange of user information at a time during normal communication when continuous transmission is occurring and before signal quality becomes degraded;

receiving said neighbour cell information during a resulting interruption; and wherein the system is a time division system, signal quality of a neighbour cell base station is monitored, and when a pause in continuous transmission occurs, and discontinuous transmission is active in an up-link transmission direction, said monitoring is performed in place of a missing transmission, and information is received between said monitoring and a next time of information reception.

* * * * *